US007507905B2

(12) United States Patent
Kanamaru et al.

(10) Patent No.: US 7,507,905 B2
(45) Date of Patent: Mar. 24, 2009

(54) ELECTRICAL JUNCTION BOX

(75) Inventors: Masahiro Kanamaru, Shizuoka-ken (JP); Makoto Nakayama, Shizuoka-ken (JP); Tarou Inoue, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/959,849

(22) Filed: Dec. 19, 2007

(65) Prior Publication Data

US 2008/0149386 A1 Jun. 26, 2008

(30) Foreign Application Priority Data

Dec. 21, 2006 (JP) .......................... P2006-344217

(51) Int. Cl.
*H02G 3/08* (2006.01)
*H02G 3/16* (2006.01)

(52) U.S. Cl. ........................ 174/50; 174/489; 174/68.1; 174/72 A; 439/76.1; 439/76.2; 439/535

(58) Field of Classification Search .................. 174/50, 174/53, 57, 58, 59, 17 R, 17 A, 66, 67, 480, 174/481, 520, 489; 220/3.2, 3.3, 3.8, 3.9, 220/4.02; 439/76.1, 76.2, 949, 465, 470; 361/638, 600, 649, 679, 724, 725, 727, 752, 361/756, 601

See application file for complete search history.

(56) References Cited

U.S. PATENT DOCUMENTS 5,674,090 A * 10/1997 Sumida et al. .............. 439/535
5,897,392 A * 4/1999 Takahashi et al. ........... 439/470
6,121,548 A * 9/2000 Matsuoka .................... 174/59
6,126,458 A * 10/2000 Gregory et al. ............ 439/76.2
6,462,270 B1 * 10/2002 Depp et al. .................. 174/50
6,605,780 B2 * 8/2003 Chiriku et al. ................ 174/59
6,768,054 B2 * 7/2004 Sato et al. ..................... 174/50
7,132,600 B2 * 11/2006 Kaneko ...................... 174/480
7,172,440 B2 * 2/2007 Kanamaru .................. 439/949
7,195,515 B2 * 3/2007 Kanamaru .................. 439/465
7,422,443 B2 * 9/2008 Kaneko et al. ............. 439/76.2

FOREIGN PATENT DOCUMENTS

JP 9-247823 9/1997

* cited by examiner

*Primary Examiner*—Angel R Estrada
(74) *Attorney, Agent, or Firm*—Finnegan, Henderson, Farabow, Garrett & Dunner, L.L.P.

(57) ABSTRACT

An electrical junction box facilitates a worker's wiring of a wire harness without using a superfluous component and allows the workability in assembling the electrical junction box as well as that in disassembling to be improved. The electrical junction box includes a box body and a cover to be mounted to the box body after wiring wire harnesses about the box body. The box body has wiring grooves shaped to have U-shaped cross sections and arranged on its exterior surface to accommodate the wire harnesses, which have been drawn out of the box body through its one side and further led from an upper part of the one side downwardly. Left and right sidewalls defining each groove are provided, at their leading ends, with temporary locking parts restricting slipping of the wire harness out of the wiring groove. The cover is provided with restricting walls (sidewalls, rib) restricting outward deflection of the left and right sidewalls. In mounting the cover to the box body, the restricting walls are inserted to the outside of the sidewalls and between the adjoining sidewalls. The restricting walls have withstanding parts formed to prevent the temporary locking parts from being deflected outside.

6 Claims, 17 Drawing Sheets

ELECTRICAL JUNCTION BOX

BACKGROUND OF THE INVENTION

1. Field of the Invention

The present invention relates to an electrical junction box mounted on an automobile.

2. Description of the Related Art

FIG. 1 is a side view showing one example of wiring a wire harness, which is popular in the related art. In FIG. 1, reference 100 denotes an electrical junction box, while reference numeral 120 denotes an obstacle. In such a case, when wiring a wire harness W out of the electrical junction box 100, it is necessary to draw the wire harness W out of the box 100 so as to avoid interference with the obstacle 120, as show in the figure.

In detail, as shown in FIG. 13, the wire harness W is drawn from an upper part of the electrical junction box 100 horizontally or obliquely downward. Then, the wire harness W is wired while restricting its wiring route with the use of a clip 102 or a protector 104 and finally led to the underside of an obstacle 120.

However, the above wiring method requires a component for restricting the wiring route, such as the clip 102 or the protector 104, in addition to the electrical junction box 100. Additionally, a worker has to fix the wire harness W on a vehicle body by means of the clip 102, the protector 104 or the like. Thus, this wiring method is apt to be expensive in terms of a production (i.e. parts and working) cost.

FIG. 2 illustrates one countermeasure to remove these drawbacks. That is, a cover 110 is attached to one side of the electrical junction box 100, restricting the drawing route for the wire harness W forcibly. According to this countermeasure, it is possible to save the production cost since there is no need of both preparing such a component for restricting the wiring route and fixing the wire harness W on a vehicle body with the use of the component independently.

Japanese Patent Application (heisei) Laid-open No. 9-247823 proposes a concrete example of the above-mentioned countermeasure.

FIG. 3 shows one of electrical junction boxes disclosed in Japanese Patent Application (heisei) Laid-open No. 9-247823. In FIG. 3, an electrical junction box 200 includes a box body 201. The box body 201 is provided, on its exterior surface, with a wiring groove 202 extending in the vertical direction and a fitting part 203 continuing the wiring groove 202. In wiring the wire harness W, a slide cover 210 is engaged with the fitting part 203 upon arranging the wire harness W in the wiring groove 202. In this way, the wire harness W is led from the upper part of the box body 210 downwardly.

FIGS. 4 and 5 show another electrical junction box 300 disclosed in the above application. The electrical junction box 300 comprises a box body 301 and a waterproof cover 310 for closing a lateral opening 302 of the box body 301. The box body 301 is provided, beside the opening 302, with a fitting part 303 for receiving the cover 310 slidably. The waterproof cover 310 has an upper plate 311 and a tubular guide part 314 formed integrally with the upper plate 311. In wiring the wire harness W, the upper plate 311 of the waterproof cover 310 is inserted into the fitting part 303, while the wire harness W is accommodated in the tubular guide part 314 of the cover 310. In this way, through the cover 310, the wire harness W is led from the upper part of the box body 301 downwardly, as shown in FIG. 5.

In the electrical junction box 200 of FIG. 3, however, if fitting or mounting a wire harness W having a number of covered wires in a bundle into the wiring groove 202, there is a possibility that the wire harness W jumps out of the wiring groove 202 due to its property of rebound (i.e. elasticity), causing a fitting or mounting operation of the cover 210 to be troublesome.

In the electrical junction box 300 of FIGS. 4 and 5, similarly, if drawing a wire harness W out of the box body 301, a worker has to handle the wire harness W through the intermediary of the tubular guide part 314 of the waterproof cover 310, causing the wiring operation to be troublesome. Additionally, the disassembling operation of the box 300 is bothersome for the worker.

SUMMARY OF THE INVENTION

Under the circumstances, it is therefore an object of the present invention to provide an electrical junction box which facilitates a worker's wiring of a wire harness without using a superfluous component and which allows the workability in assembling the electrical junction box as well as that in disassembling to be improved.

An aspect of the present invention is an electrical junction box comprising, a box body configured to accommodate an electrical component; and a cover mounted on an exterior surface of a lateral side of the box body after a wire harness is wired to the box body, wherein the box body has a frontal-open type wiring groove formed on the exterior surface of the lateral side of the box body to accommodate the wire harness drawn out of the lateral side of the box body and further led from an upper part of the lateral side downwardly, the wiring groove having a U-shaped cross section, the wiring groove is defined by left and right sidewalls projecting from the exterior surface of the lateral side of the box body, the left and right sidewalls of the wiring groove have, at respective leading ends thereof, temporary locking parts projecting inside with each other for restricting slipping of the wire harness out of the wiring groove, and the cover has restricting walls configured to restrict outward deflection of the left and right sidewalls of the wiring groove by being respectively positioned outside the left and right sidewalls of the wiring groove on condition that the cover is mounted to the box body.

According to the aspect of the invention, since the cover is mounted upon engaging the wire harness into the wiring groove, it is possible to automatically determine the wiring route for harnesses without using any superfluous component, such as clip and protector, allowing a reduction of a worker's burden in assembling the wire harness.

As the temporary engagement for wire harnesses is accomplished by the temporary locking parts at the same time of mounting the wire harness into the wiring groove, it is possible for a worker to fix the cover in the fixed position on the box body without feeling nervous above rebound phenomenon of the wire harnesses, allowing a reduction in both assembling labor and time.

Furthermore, as the deflection of the left and right sidewalls of the wiring groove is restricted by the restricting walls of the cover, the wire harness could be supported strongly and certainly even if an external force is applied on the wire harness. That is, with the implementation of double locking by both the temporary locking parts and the restricting walls, it is possible to increase holding power of the electrical junction box for the wire harness.

Additionally, since the wire harness is protected by the cover, it is possible to enhance the water proofing property of the electrical junction box.

Still further, as the wire harness can be detached from the box body by only detaching the cover and successively pulling out the wire harness, the electrical junction box of the embodiment is superior to disassembling property, providing a contribution in aspect of the recycling of resources.

The temporary locking parts may be formed by tip inclined parts resulting from inclining leading edges of the left and right sidewalls of the wiring groove inwardly, and the restricting walls of the cover may include withstanding parts configured to prevent the tip inclined parts from being deflected outside by contacting with respective outsides of the tip inclined parts.

With the above configuration, since the withstanding parts of the cover prevent the leading edges of the left and right sidewalls of the wiring groove from being deflected outside, it is possible to hold the wire harness more strongly.

The cover may be configured to be mounted onto the exterior surface of the lateral side of the box body by a sliding movement from an upside of the box body, and the box body and the cover may respectively have slide guides configured to guide the sliding movement of the cover.

With the above configuration, since the provision of the slide guides of both the cover and the box body allows the cover to be slidable in a direction to intersect with the mounting direction of the wire harness into the wiring groove, there is no possibility of the cover being detached from the box body due to the resilience of the wire harness.

Additionally, as only the cover's downward sliding through the guidance of the slide guides allows the cover to be mounted or fitted in a fixed position on the lateral side of the box body, it is possible to provide the electrical junction box allowing the cover to be attached to the box body easily and smoothly.

The wiring groove on the exterior surface of the box body may comprise a plurality of wiring grooves juxtaposed to each other, the restricting walls of the cover may include left and right sidewalls of the cover restricting an outward deflection of leftmost and rightmost sidewalls of the left and right sidewalls of all of the wiring grooves, and the restricting wall except the left and right sidewalls of the cover may be formed by a rib formed on an interior surface of the cover so as to be inserted between two opposing sidewalls of the adjoining wiring grooves.

With the above configuration, it is possible to wire a plurality of wire harnesses about the electrical junction box in the same way as above.

The temporary locking parts may be formed in only respective middle portions of the left and right sidewalls of the wiring groove in a longitudinal direction of the left and right sidewalls of the wiring groove.

With the above configuration, since the temporary locking parts are formed in only respective middle portions of the sidewalls in the longitudinal direction of the wiring groove, it is possible to moderate the restriction for the wire harness in both upper and lower portions of the wiring groove. Accordingly, if mounting the wire harness into the wiring groove through its upper portion, the wire harness can be easily mounted into the groove under no influence of the temporary locking parts on both sides at the initial stage of mounting operation. Thus, the temporary locking parts become effective only after the wire harness has been mounted into the groove to some extent degree. Also, when pulling the wire harness out of the groove through the lower portion, the wire harness can be pulled out smoothly since the temporary locking parts do not make resistance at the initial stage of a worker's pulling operation.

The left and right sidewalls of the wiring groove may have top corners cut in a slanted shape or in a curved shape, and the cover may have a slanted or curved part according with the slanted shape or the curved shape.

With the above configuration, since the left and right sidewalls of the wiring groove have the top corners cut out slantingly or in a curve, a worker can mount the wire harness into the wiring groove easily without fearing that the wire harness might hook on the corners accidentally. In connection, as the cover is formed with the slanted wall according with the so-formed corners, it is possible to bear down on the wire harness appropriately.

These and other objects and features of the present invention will become more fully apparent from the following description and appended claims taken in conjunction with the accompany drawings.

BRIEF DESCRIPTION OF THE DRAWINGS

FIGS. 14A to 14C are cross sectional views to explain the operation of mounting wire harnesses into wiring grooves of the box body, in which FIG. 14A shows a state before mounting them, FIG. 14B shows a state during mounting them and FIG. 14C shows a state after mounting them.

DESCRIPTION OF THE PREFERRED EMBODIMENT

An embodiment of the present invention will be described with reference to the drawings.

Figure 1:
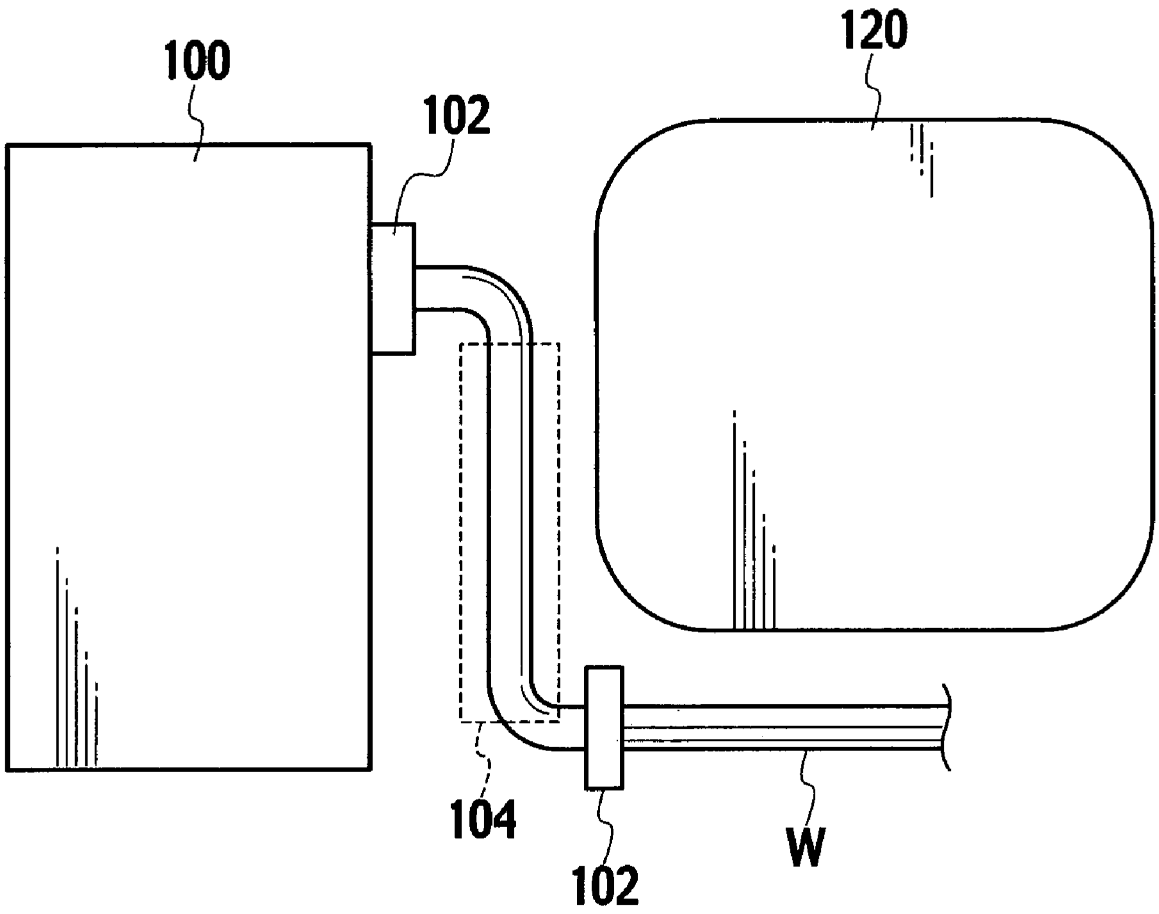
FIG. 1 PRIOR ART
FIG. 1 is a side view showing an example of wiring a wire harness in related art.
Figure 2:
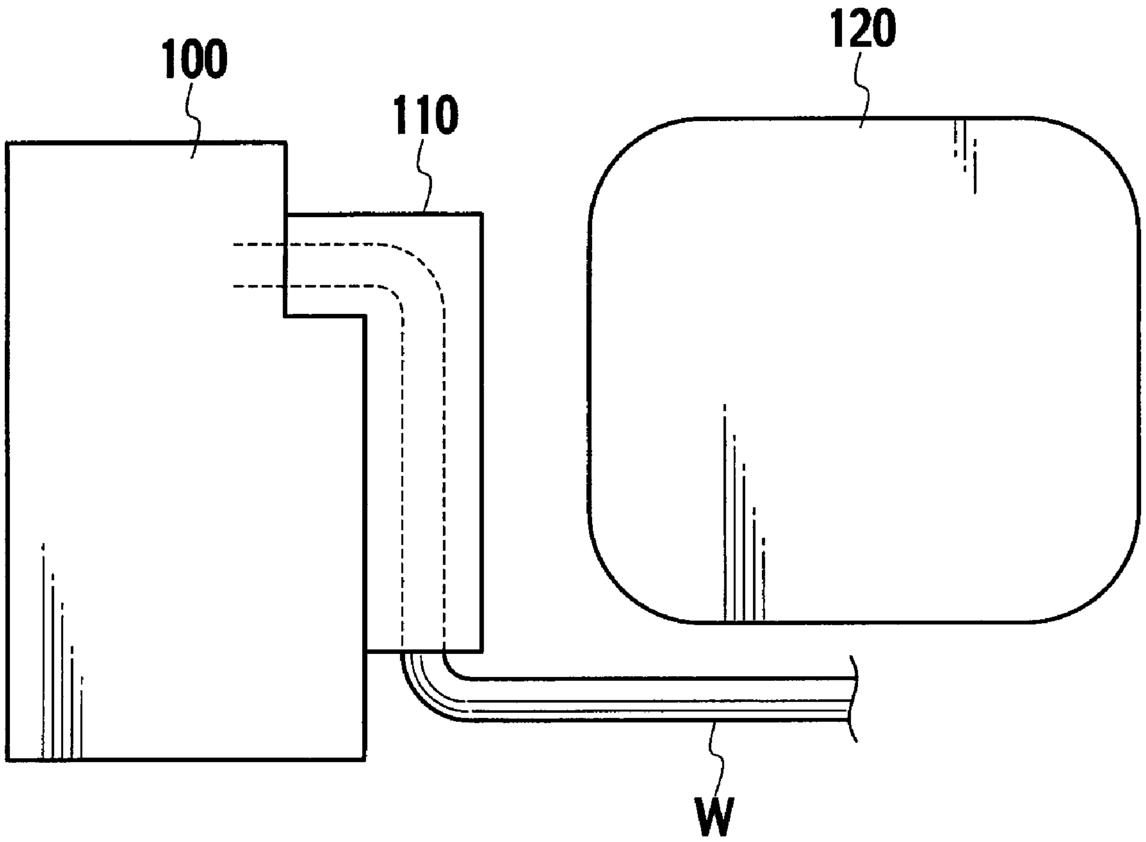
FIG. 2 PRIOR ART
FIG. 2 is a side view showing another example of wiring a wire harness in related art.
Figure 3:
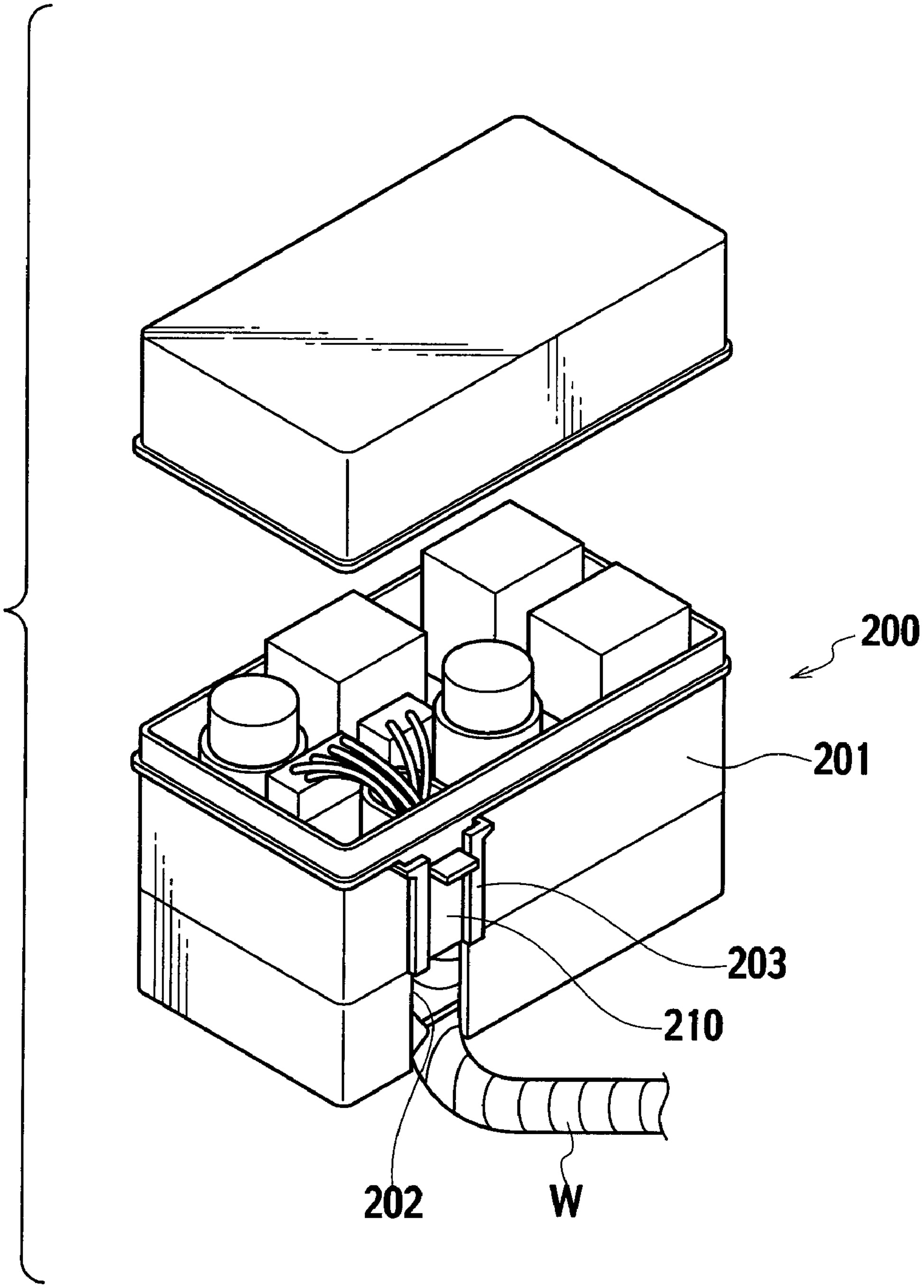
FIG. 3 PRIOR ART
FIG. 3 is a perspective view showing a concrete arrangement by way of an example in related art.
Figure 4:
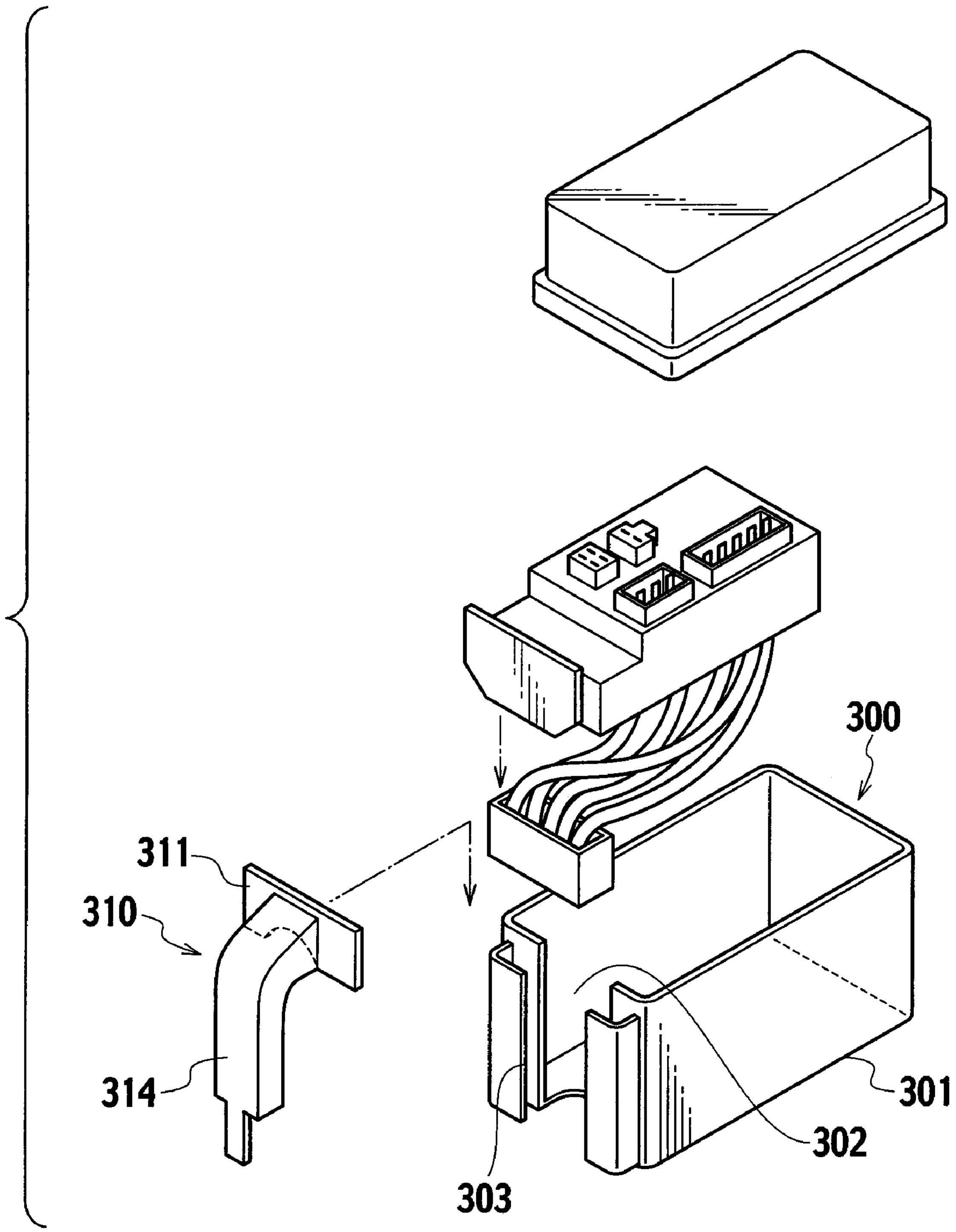
FIG. 4 PRIOR ART
FIG. 4 is a perspective view showing a concrete arrangement by way of another example in related art.
Figure 5:
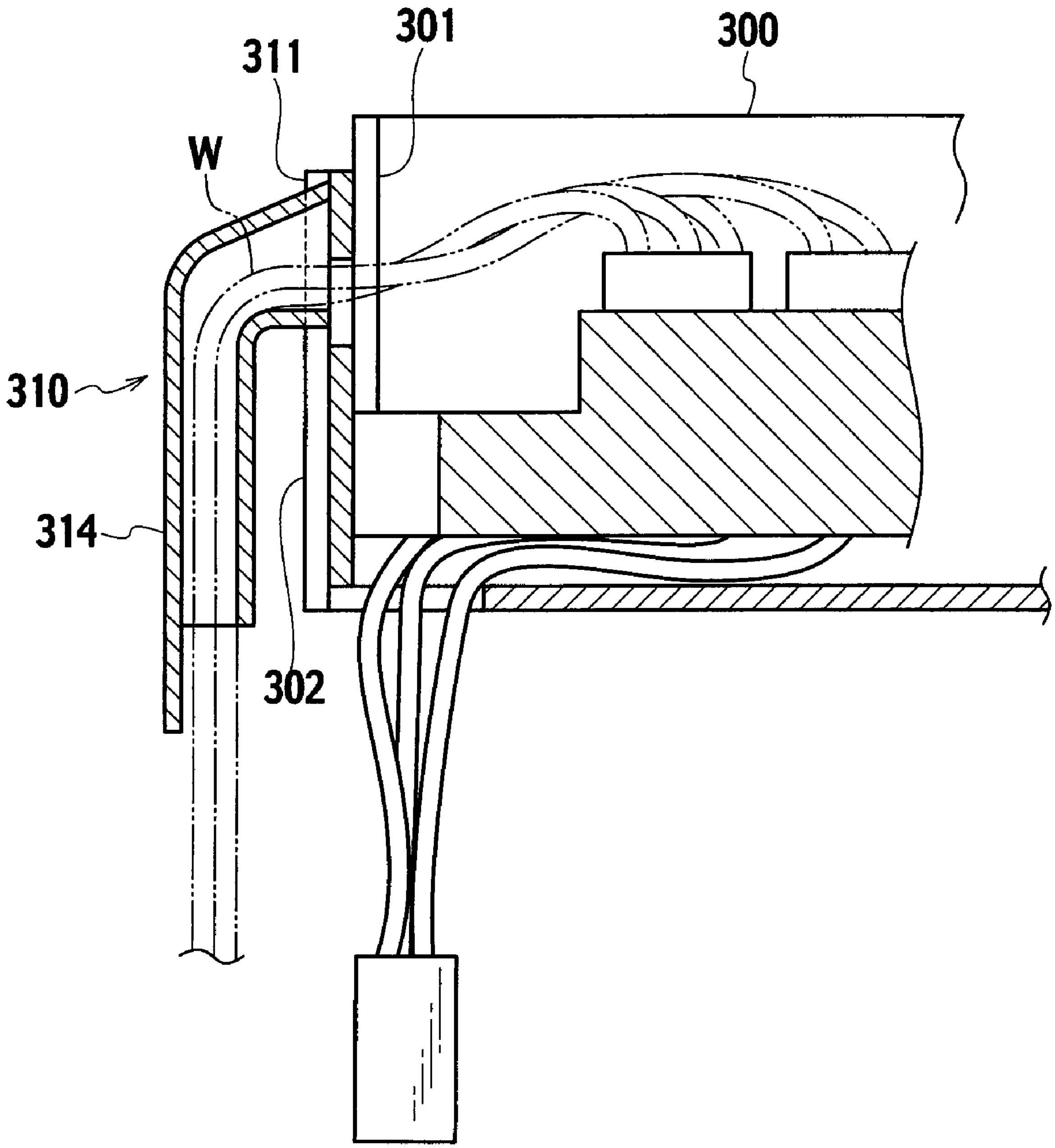
FIG. 5 PRIOR ART
FIG. 5 is a sectional side view showing an arrangement where a wire harness is wired in an electrical junction box of FIG. 4.
Figure 6:
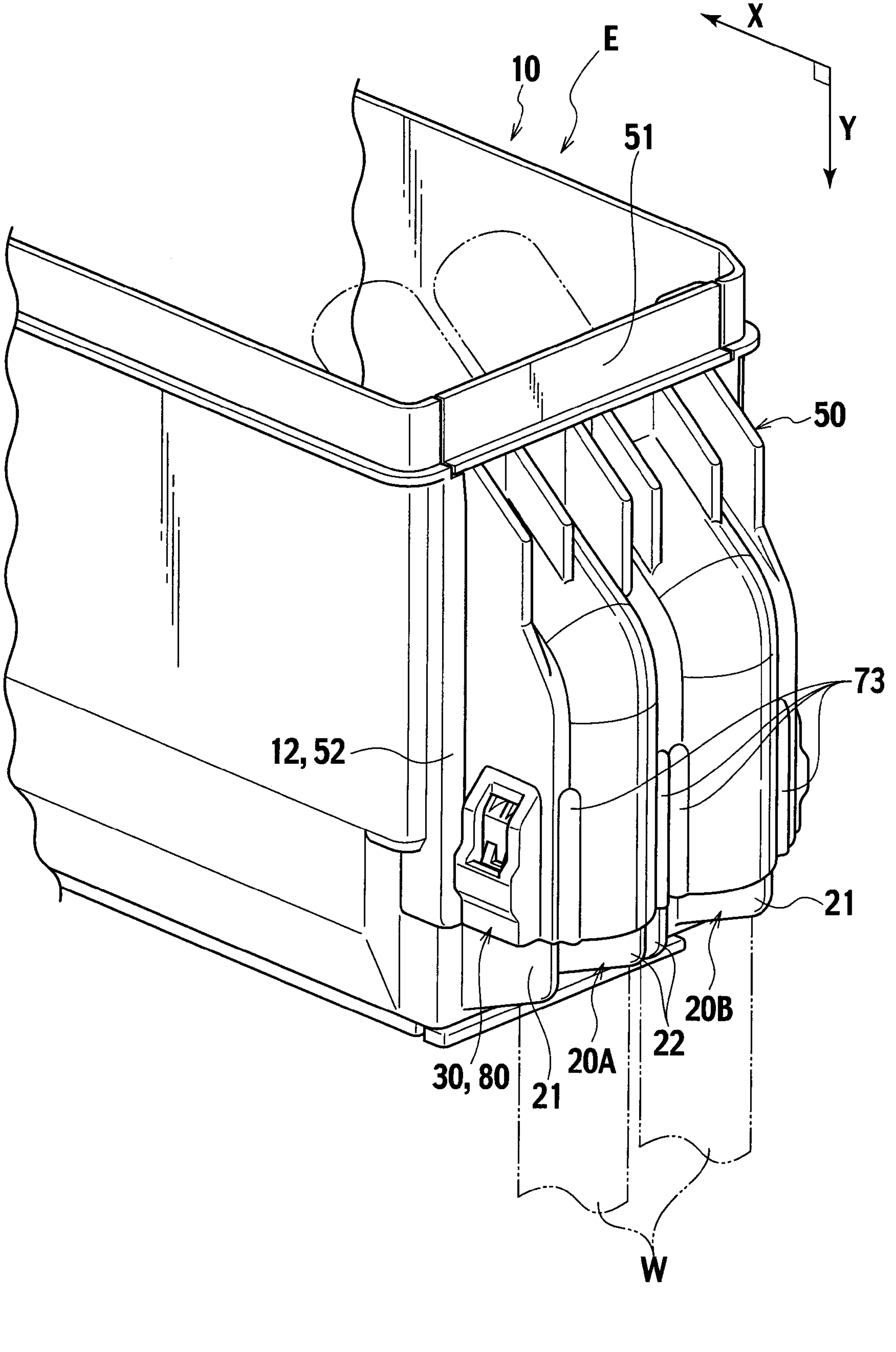
FIG. 6 is a perspective view of the substantial part of an electrical junction box where a box body is combined with a cover, in accordance with an embodiment of the present invention.
Figure 7:
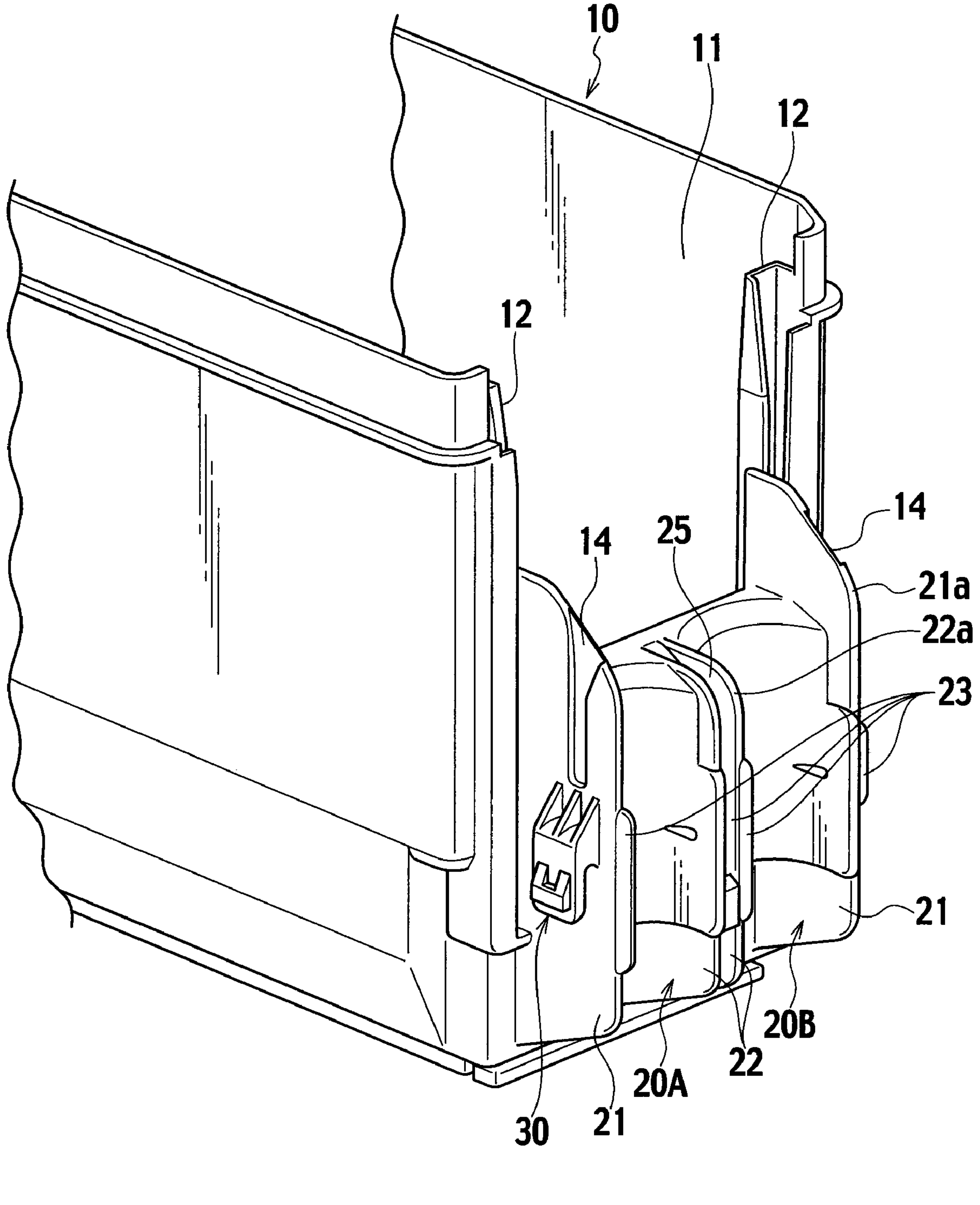
FIG. 7 is a perspective view of the substantial part of the box body of FIG. 6.
Figure 8:
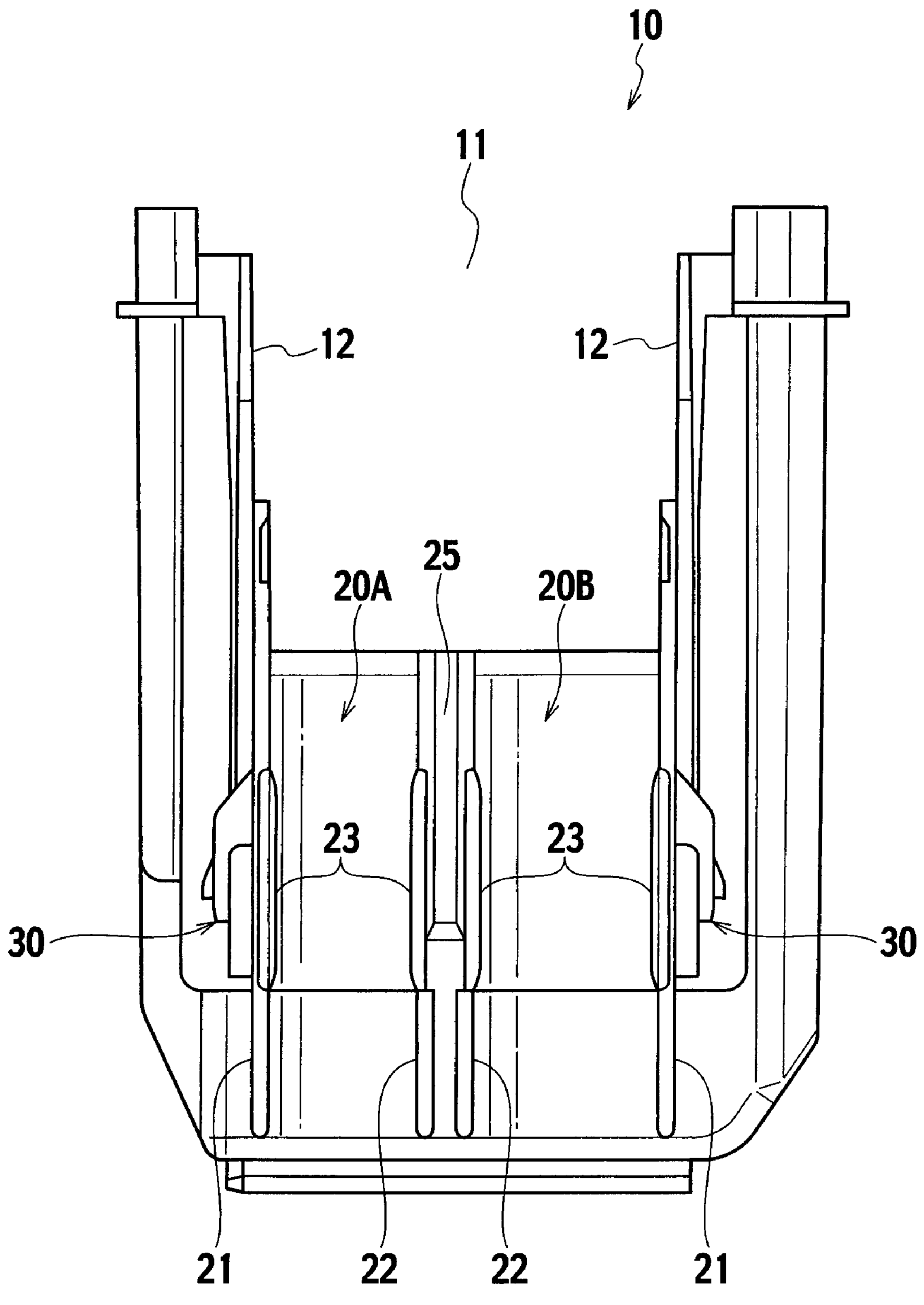
FIG. 8 is a front view of the substantial part of the box body of FIG. 6.
Figure 9:
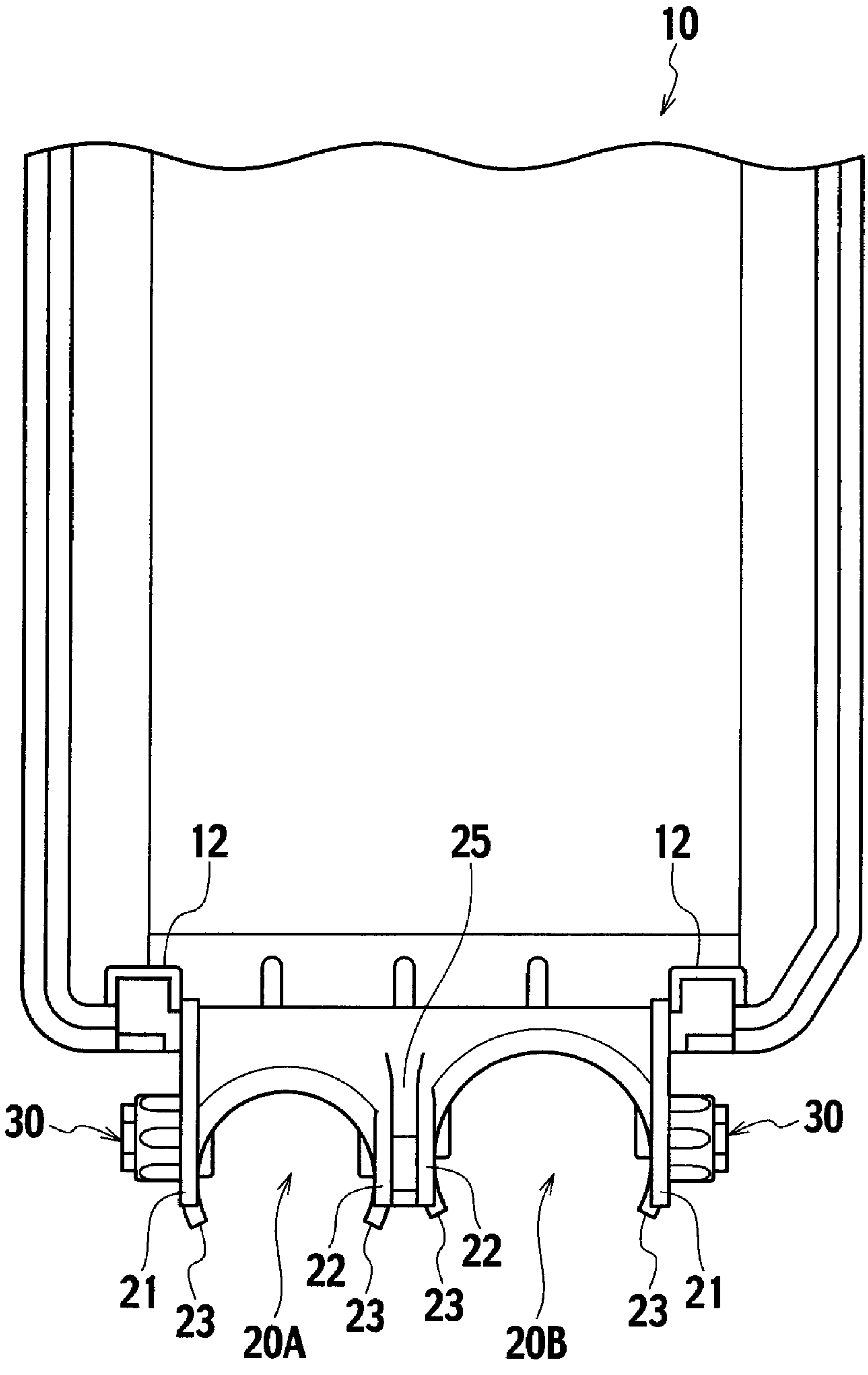
FIG. 9 is a plan view of the substantial part of the box body of FIG. 6.
Figure 10:
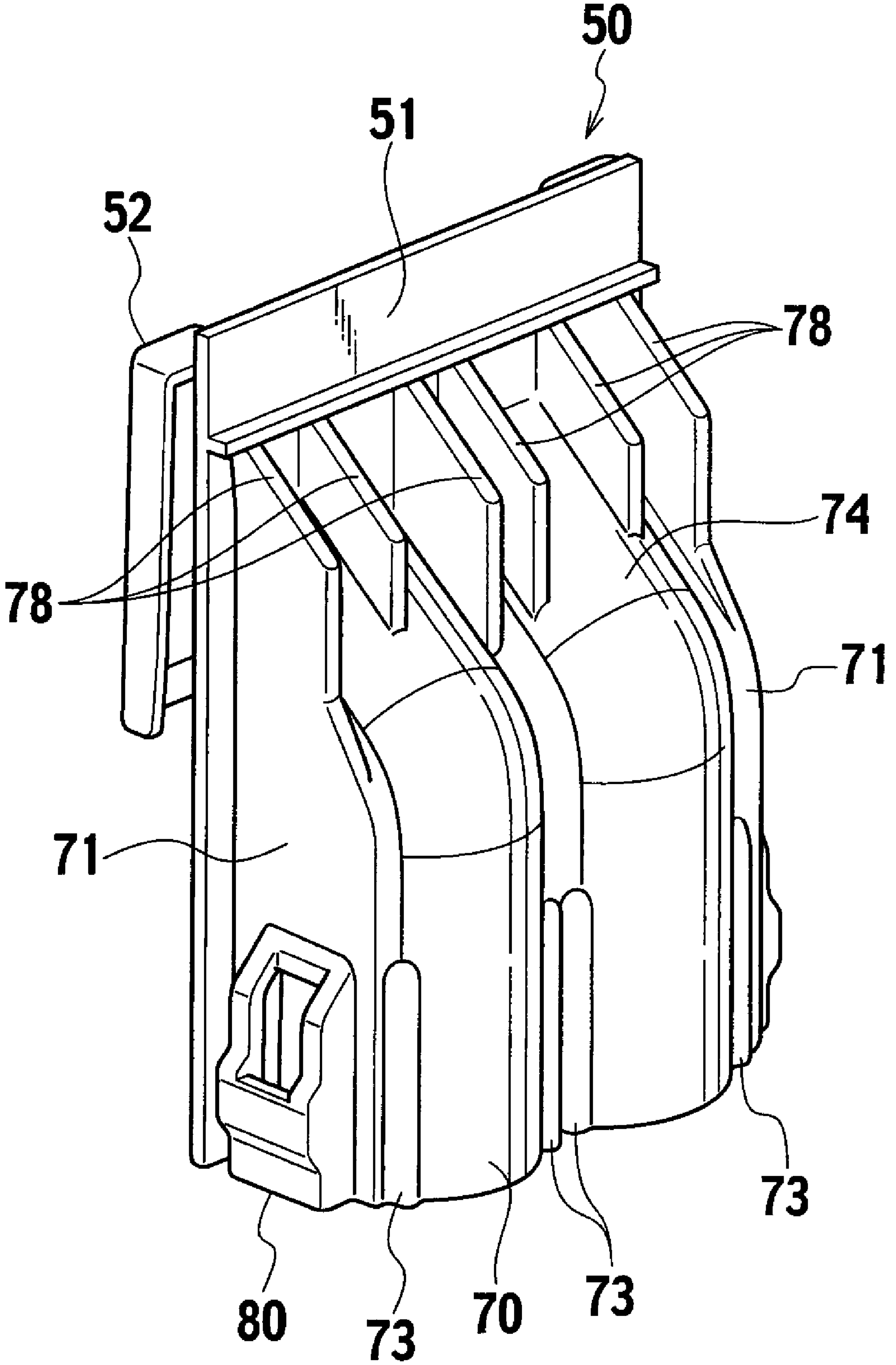
FIG. 10 is an exterior perspective view of the cover of FIG. 6.
Figure 11:
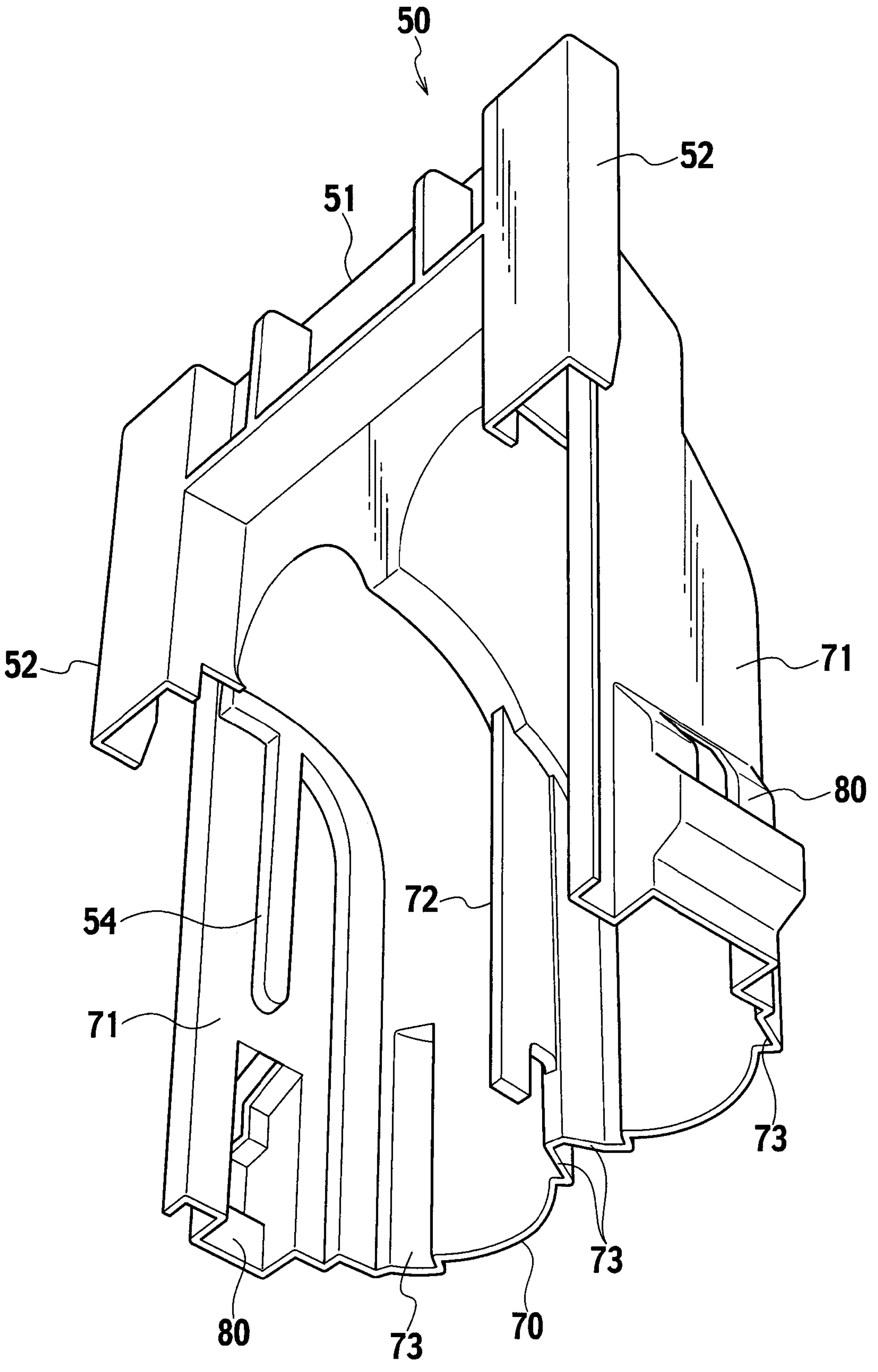
FIG. 11 is an interior perspective view of the cover of FIG. 6, viewed from its underside obliquely.
Figure 12:
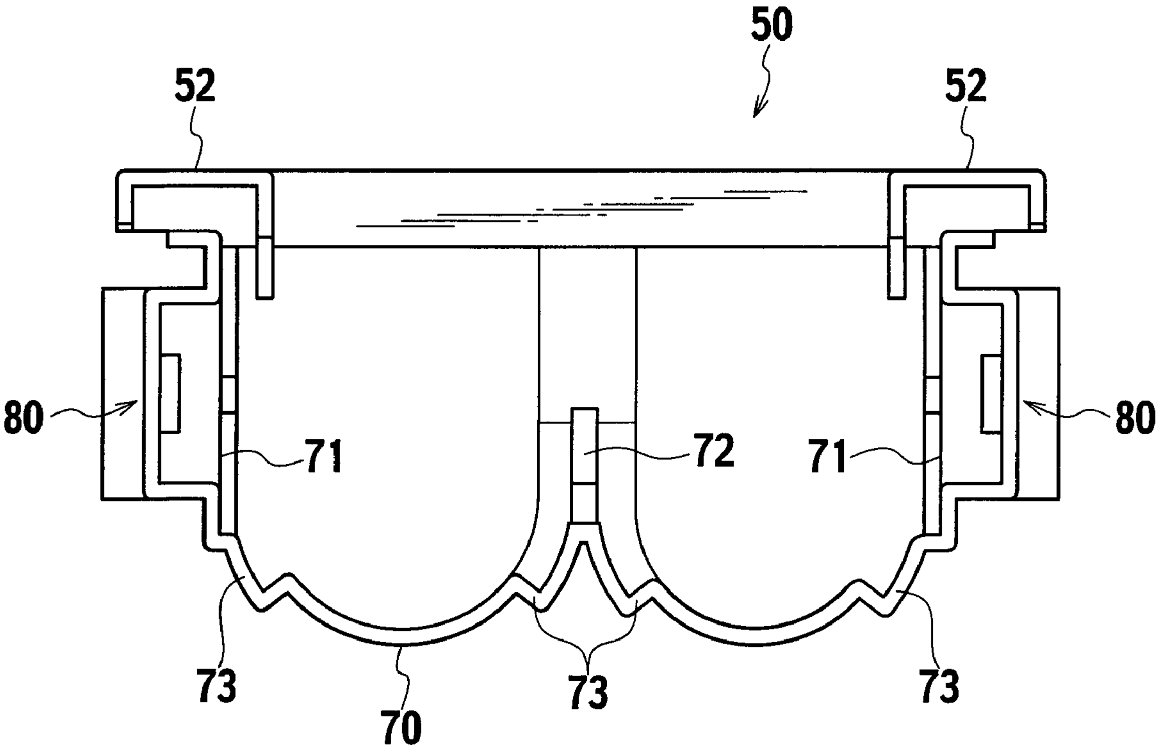
FIG. 12 is a bottom view of the cover of FIG. 6.
Figure 13:
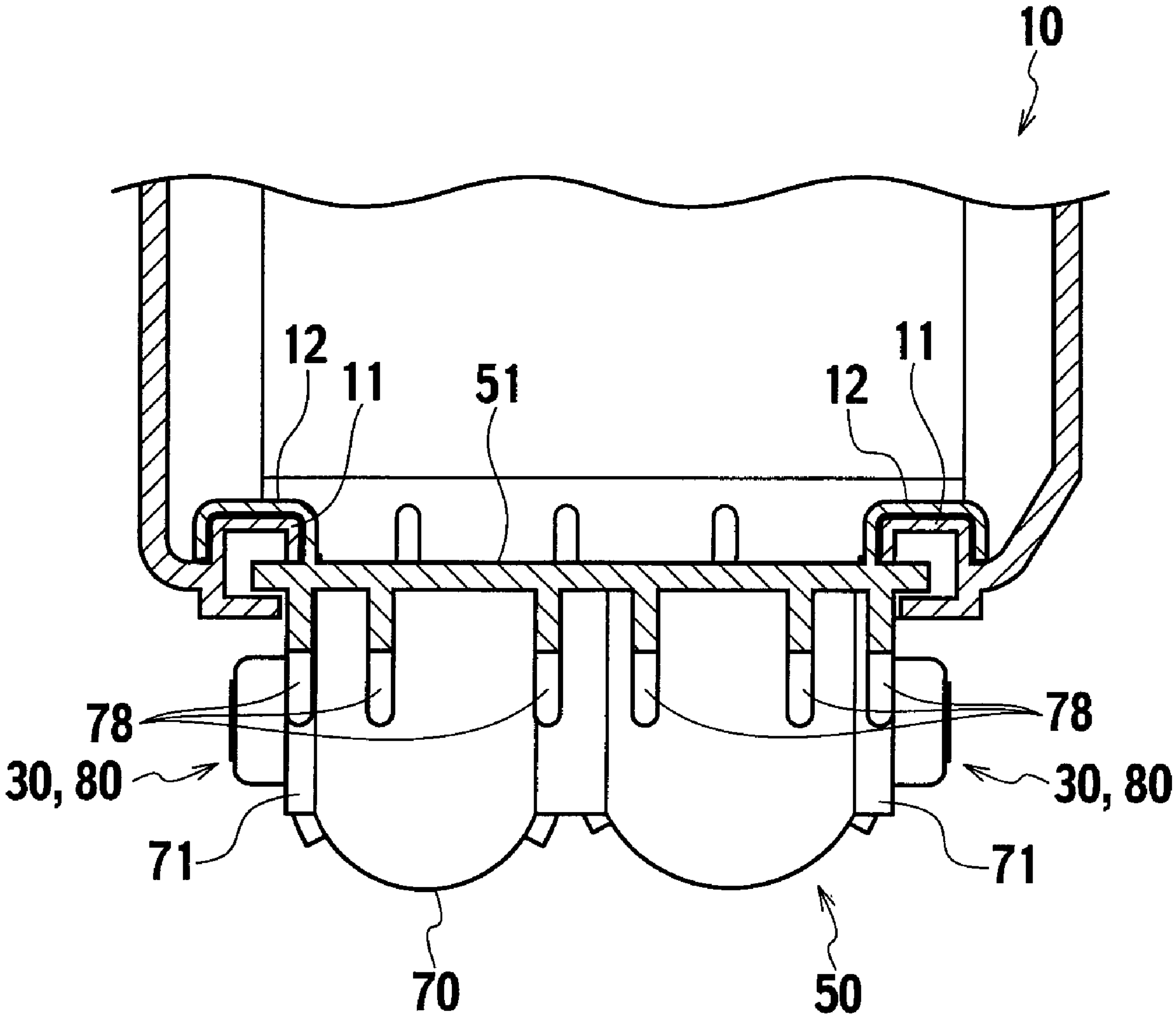
FIG. 13 is a cross sectional view of an upper section of the cover combined with the box body.
Figure 14A:
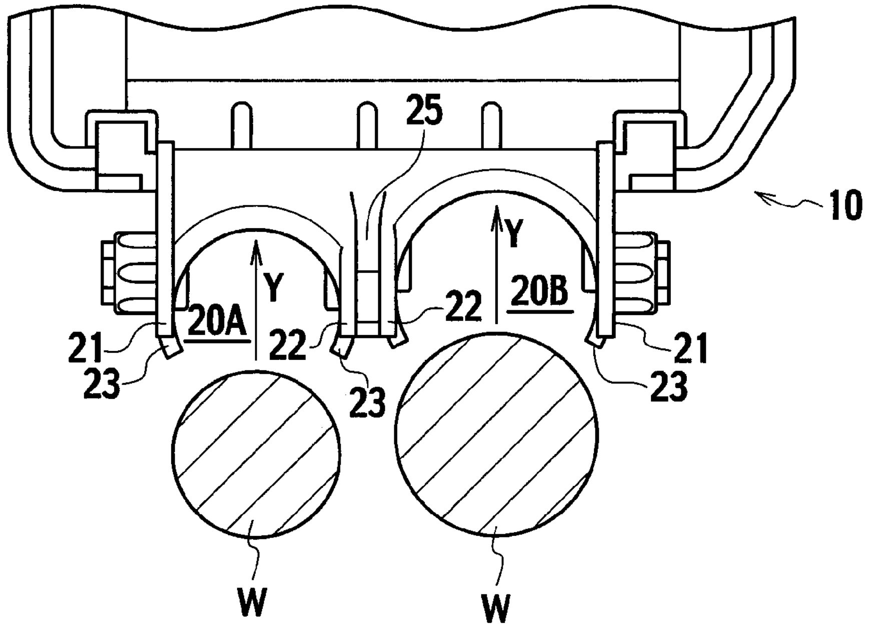
Figure 14B:
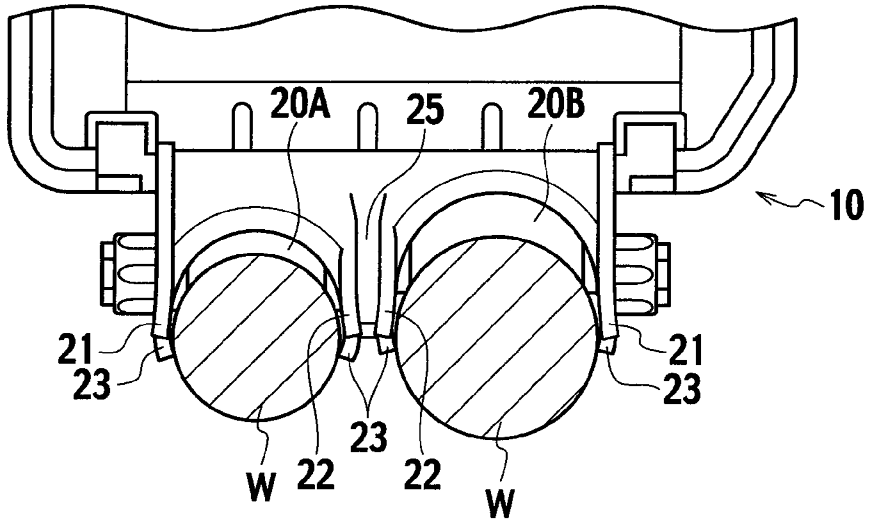
Figure 14C:
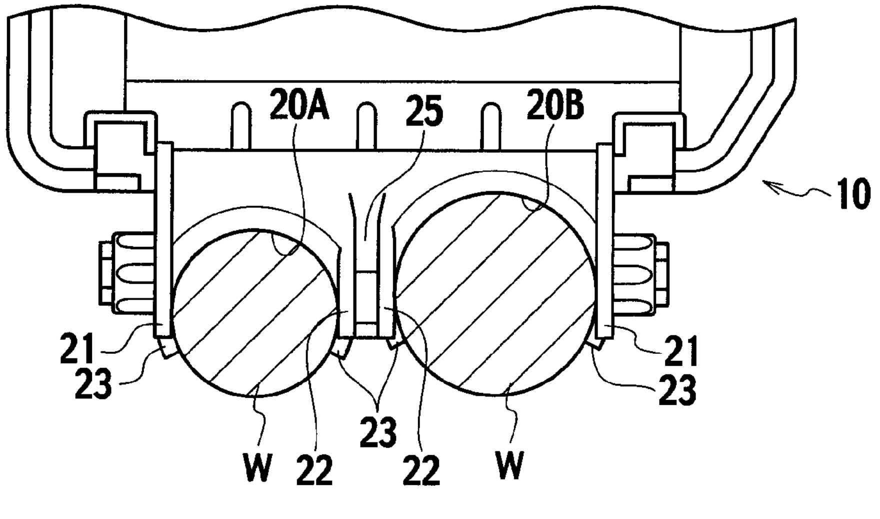
Figure 15:
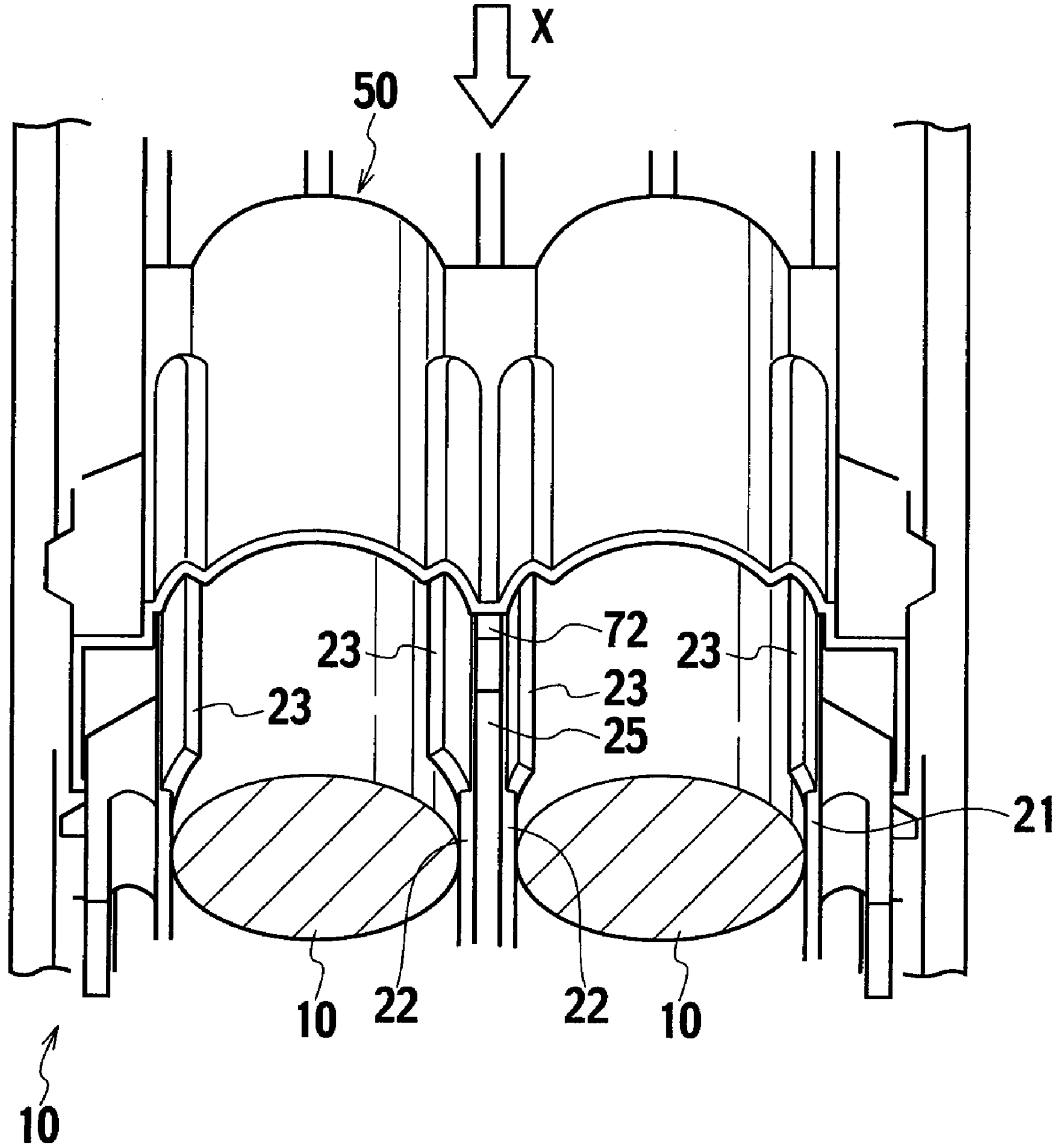
FIG. 15 is a perspective view showing a state that the wire harnesses are being mounted into the wiring grooves of the box body, also viewed from its underside obliquely.
Figure 16:
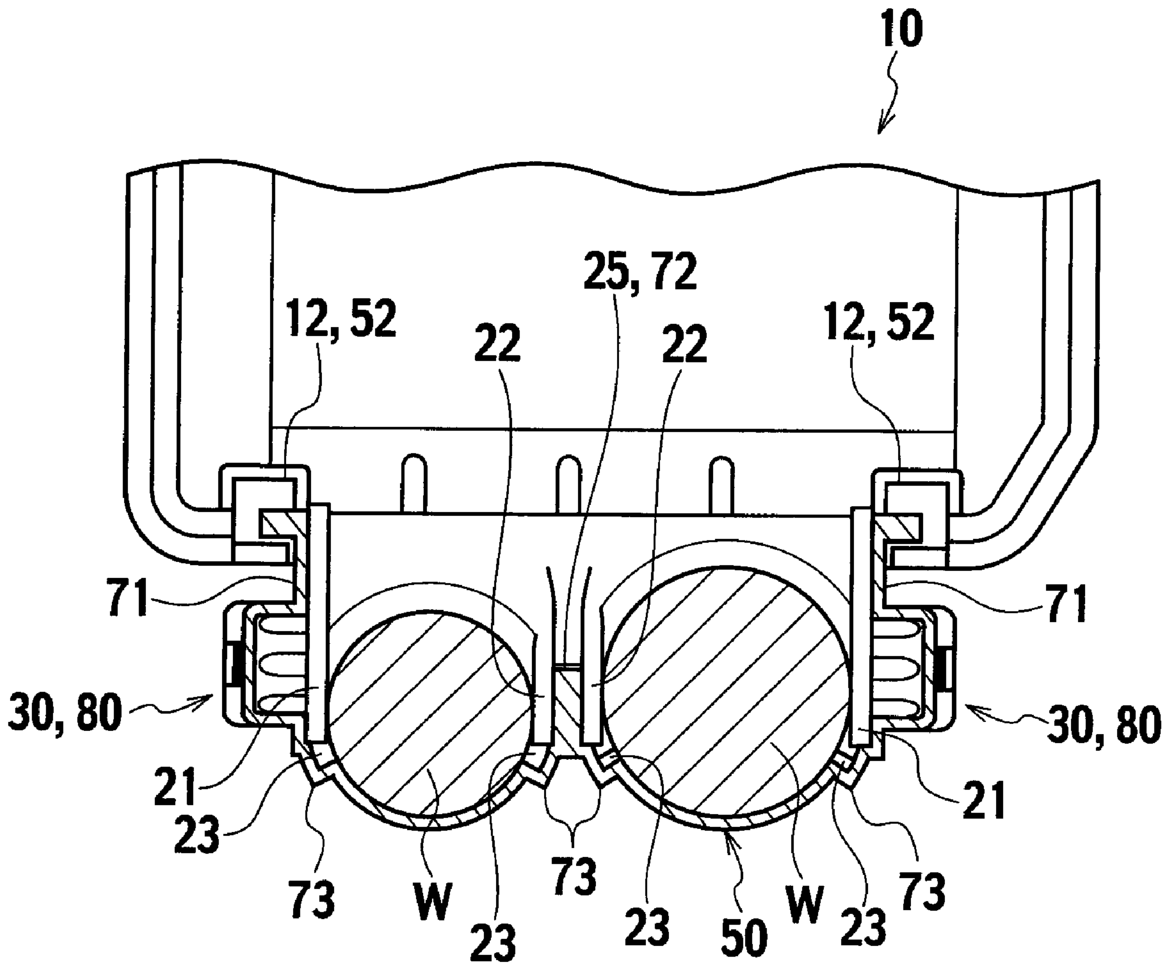
FIG. 16 is a cross sectional view of an arrangement where the wire harnesses are mounted into the wiring grooves and the cover is further mounted thereon.
Figure 17:
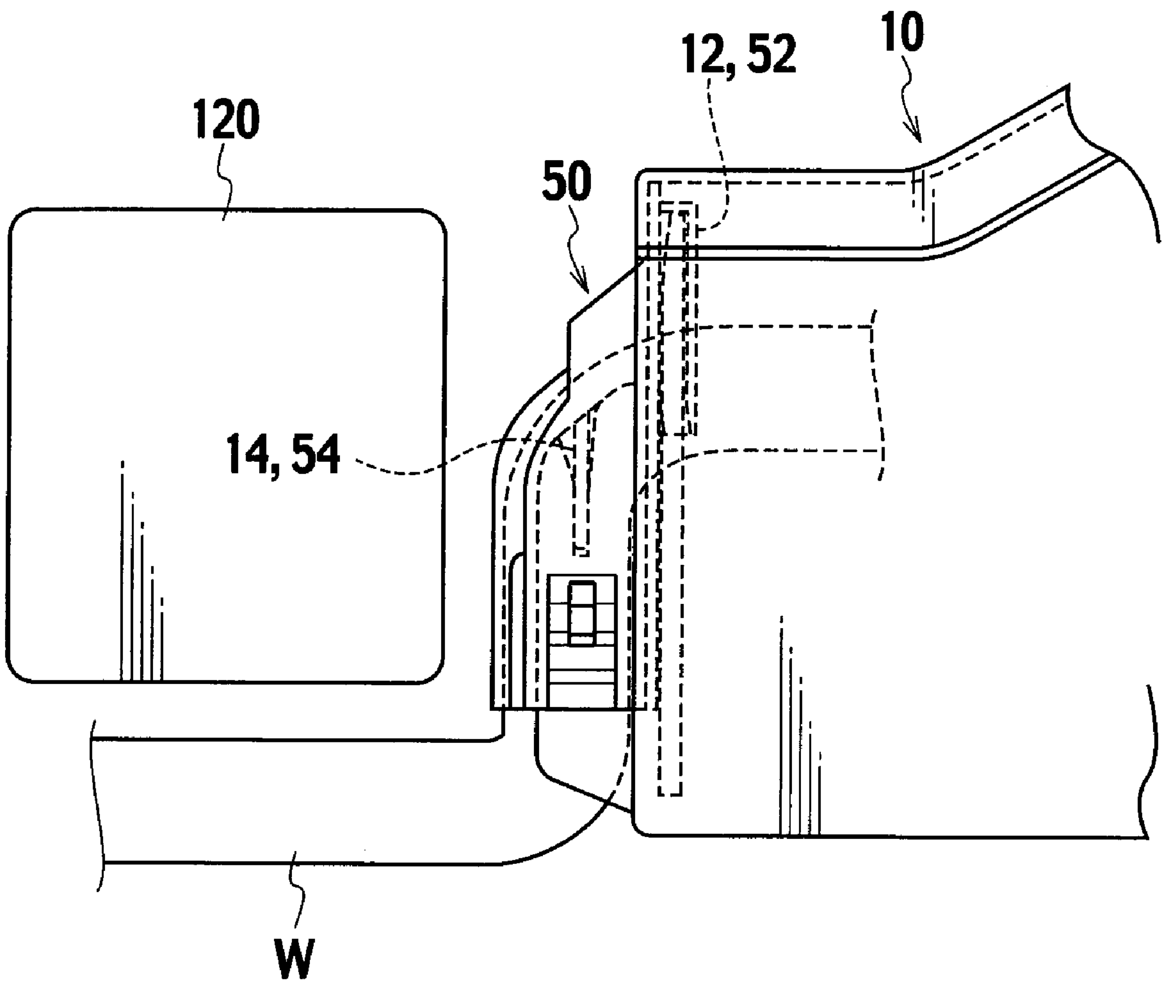
FIG. 17 is a side view of FIG. 16.

In these figures, FIG. 6 is a perspective view of the substantial part of an electrical junction box where a box body is combined with a cover, in accordance with an embodiment of the present invention, FIG. 7 a perspective view of the substantial part of the box body of FIG. 6, FIG. 8 a front view of the substantial part of the box body of FIG. 6, FIG. 9 a plan view of the substantial part of the box body of FIG. 6, FIG. 10 an exterior perspective view of the cover of FIG. 6, FIG. 11 an interior perspective view of the cover of FIG. 6, viewed from its underside obliquely, FIG. 12 a bottom view of the cover of FIG. 6, FIG. 13 a cross sectional view of an upper section of the cover combined with the box body, FIGS. 14A to 14C cross sectional views to explain the operation of mounting wire harnesses into wiring grooves of the box body, in which FIG. 14A a state before mounting them, FIG. 14B shows a state during mounting them and FIG. 14C shows a state after mounting them, FIG. 15 a perspective view showing a state that the wire harnesses are being mounted into the wiring grooves of the box body, also viewed from its underside obliquely, FIG. 16 a cross sectional view of an arrangement where the wire harnesses are mounted into the wiring grooves and the cover is further mounted thereon, and FIG. 17 is a side view of FIG. 16.

This electrical junction box E comprises a plastic (synthetic resin) box body 10 in which electrical components etc. are accommodated and a plastic cover 50 which is mounted onto an exterior surface of one side of the box body 10 after wiring wire harnesses.

The cover 50 comprises a slidable waterproof member that can be mounted onto the exterior surface of a lateral side of the box body 10 by sliding the member from an upside of the box body 10. In order to allow the sliding movement of the cover 50, the box body 10 is provided, on both sides of its lateral opening 11, with respective slide guides 12, as shown in FIGS. 6 and 7. In FIG. 6, an arrow a represents a direction to slide the cover 50. This direction X will be referred to as "sliding direction" hereinafter. Similarly, the cover 50 is provided, on both sides of its front end, with respective slide guides 52 for slidable engagement with the slide guides 12, 12 of the box body 10, as shown in FIG. 6 and 10.

While allowing the cover 50 to freely slide in an up-and-down direction (i.e. the sliding direction) to the box body 10 in assembling, these slide guides 12, 52 carry out a function of restricting movement of the cover 50 in the other directions. The slide guides 12, 52 are respectively provided with stoppers (not indicated with reference numerals) that restrict further downward movement of the cover 50 after its arrival at a fixed position.

On the exterior surface of the box body's part (10) below the lateral opening 11, a pair of "frontal-open type" wiring grooves 20A, 20B having U-shaped sections are formed to accommodate wire harnesses W, W (FIG. 7) which have been drawn out of box body 10 through the lateral opening 11 and further led from the upper part of the opening 11 downwardly. In the shown embodiment, the wiring grooves 20A, 20B are juxtaposed to each other, having different cross sectional areas corresponding to respective diameters of the wire harnesses W, W to be mounted, as shown in FIG. 9.

The wiring groove 20A is defined by left and right sidewalls 21, 22 projecting from the exterior surface of the side of the box body 10. Similarly, the other wiring groove 20B is defined by left and right sidewalls 22, 21 projecting from the exterior surface of the side of the box body 10. Each of the sidewalls 21, 22 is provided, at a tip (projecting end) thereof, with a temporary locking part 23 that restricts slipping of the wire harness W out of the wiring groove 20A (20B). In the embodiment, the temporary locking part 23 is formed by a tip inclined part resulting from inclining the leading edge of the sidewall 21 (22) inwardly. Further, in the longitudinal direction of the wiring groove 20A (20B), the temporary locking part 23 is formed in the middle portion of the sidewall 21 (22).

As shown in FIG. 10, the cover 50 is provided, in its upper portion, with a seal wall 51 for closing up the lateral opening 11 of the box body 10. Below the seal part 51, the cover 50 has a lower half portion formed to have a substantial U-shaped cross section. This lower half portion comprises a front wall 70 having a width generally equal to the width of the seal wall 51 and sidewalls 71, 71 on both sides of the front wall 70. The front wall 70 is shaped to have two semi-cylindrical walls juxtaposed to each other, corresponding to respective curvatures of the wire harnesses W, W. The upper part of the front wall 70 is connected to the lower end of the seal wall 51 through a slanted wall 74. On the exterior surface of the slanted wall 74, a plurality of parallel ribs 78 are formed so as to extend in the vertical direction of the cover 50.

Inside the cover 50, as shown in FIG. 11, a center wall (rib) 72 is formed between the sidewalls 71, 71. Under condition that the cover 50 is mounted onto the box body 10, the sidewalls 71, 71 of the cover 50 are positioned outside the sidewalls 21 of the box body 10. Then, the center wall 72 is inserted into a deflection space 25 between the opposing sidewalls 22, 22. In the assembled state, the sidewalls 71, 71 and the center wall 72 of the cover 50 serve to restrict outward deflections of the sidewalls 21, 22. Note that these walls 71, 72 may be referred to as "restricting walls 71, 72", hereinafter.

Additionally, the restricting walls 71, 72 are provided, at respective base portions, with withstanding parts 73 that contact with or abut on the temporary locking parts 23 (FIG. 6) to prevent them from being deflected outwardly.

In the sidewalls 21, 22 on both sides of the wiring grooves 20A, 20B, as shown in FIG. 7, respective top corners 21*a*, 22*a* are cut out obliquely (in a slanted shape) or shaped in a curve. The above slanted wall 74 of the cover 50 is provided so as to follow the profiles of the so-formed top corners 21*a*, 22*a* of the sidewalls 21, 22.

In order to reinforce the above-mentioned slide guides 12, 52, the box body 10 and the cover 50 are respectively provided with second slide guides (14, 54). In the box body 10, the second slide guides 14, 14 are arranged on the exterior surfaces of the outermost sidewalls 21, 21, in the form of grooves, as shown in FIG. 7. On the other hand, in the cover 50, the second slide guide 54, 54 are arranged on the inside surfaces of the sidewalls 71, 71, in the form of projecting ribs, as shown in FIG. 11. In As obvious from FIG. 17, in view from the outside of the cover 50 against the box body, the second slide guides 14, 54 are positioned on the near side of a viewer (worker) in comparison with the former slide guides 12, 52.

As shown in FIG. 6, the electrical junction box E is provided with locking mechanisms 30, 80 on both sides of the box body 10 and the cover 50. The locking mechanisms 30 on the side of the box body 10 are arranged on the exterior surfaces of the outermost sidewall 21, in the form of arm-type projections. While, on the side of the cover 50, the locking mechanisms 80 are arranged on the exterior surfaces of the sidewalls 71, in the form of projecting receptacles for receiving the arm-type projections in their locked state.

The above-mentioned elements forming the electrical junction box E operates as follows.

When assembling the electrical junction box E, as shown in FIGS. 14A and 14B, it is firstly performed to mount the wire harnesses W into the wiring grooves 20A, 20B, respectively along a mounting direction with arrow Y of FIG. 14A. Note that this direction Y is perpendicular to the above sliding direction X (see FIG. 6). In connection, each interval between the opposing temporary locking parts 23 on both sides of each groove 20A (20B) is established smaller than the diameter of the wire harness W to be mounted into the relevant groove 20A (20B). Therefore, in the process of mounting the wire harnesses W into the corresponding wiring grooves 20A, 20B, the sidewalls 21 are bent somewhat outwardly, while the opposing sidewalls 22 are bent somewhat inwardly so as to get close to each other. Once the wire harnesses W have been mounted into the wiring grooves 20A, 20B, the sidewalls 22 return to their original positions, as shown in FIG. 14C. In this state, since the temporary locking parts 23 operate to hold on the wire harnesses W being mounted into the wiring grooves 20A, 20B temporarily, it is possible to prevent the wire harnesses W, W from jumping out of the wiring grooves 20A, 20B due to their properties of rebound (i.e. elasticity).

Next, it is performed to attach the cover 50 to the box body 10. In detail, the cover 50 is slid downwardly while maintaining a condition that the slide guides 52, 54 are engaged with the slide guides 12, 14 of the box body 10. In the final state of the sliding of the cover 50, the locking mechanisms 30, 80 are locked up. In this way, as the cover 50 can be fixed in a fixed position of the box body 10 by only sliding the cover 50 downwardly with the aid of guidance by the slide guides 12, 52, 14 and 54, it is possible to attach the cover 50 to the box body 10 easily and smoothly.

When the cover 50 is mounted in the fixed position, the restricting walls (the sidewalls 71, the center wall 72) of the cover 50 are arranged outside the sidewalls 21 of the wiring grooves 20A, 20B and also inserted into the deflection space 25 between the sidewalls 22, while the withstanding parts 73 contact with or abut on respective outside surfaces of the temporary locking parts 23. Consequently, outward bending of the sidewalls 21, 22 is suppressed by the restricting walls 71, 72 and additionally, outward deflection of the temporary locking parts 23 can be prevented by the withstanding parts 73.

Thus, according to the embodiment, it is possible to ensure holding of the electrical junction box against the wire harnesses W strongly. Namely, with the implementation of double-engagement by both the temporary locking parts 23 of the box body 10 and the restricting walls (the sidewalls 71, the center wall 72) of the cover 50, it is possible to improve retaining force of the electrical junction box E against the wire harnesses W.

Further, as the provision of the slide guides 12, 52, 14 and 54 allows the cover 50 to be slidable in a direction (i.e. the sliding direction X) to intersect with the mounting direction Y of the wire harnesses W into the wiring grooves 20A, 20B, there is no possibility of the cover 50 being detached from the box body 10 due to the resilience of the wire harnesses W.

With the structure where the cover 50 is mounted upon engaging the wire harnesses W into the wiring grooves 20A, 20B, since the wiring route for harnesses is automatically determined without using any superfluous component (e.g. clip, protector), it is possible to reduce a worker's burden in assembling the wire harnesses as well as its manufacturing cost.

As the temporary engagement for wire harnesses is accomplished by the temporary locking parts 23 at the same time of mounting the wire harnesses W into the wiring grooves 20A, 20B, it is possible for a worker to fix the cover 50 in the fixed position on the box body 10 without feeling nervous above rebound phenomenon of the wire harnesses, saving assembling labor and time.

Additionally, since the wire harnesses W are protected by the cover 50, it is possible to enhance the water proofing property of the electrical junction box E.

Still further, as the wire harnesses W can be detached from the box body 10 by only detaching the cover 50 and successively pulling out the wire harnesses W, the electrical junction box of the embodiment is superior to disassembling property, providing a contribution in aspect of the recycling of resources.

In the embodiment, since the temporary locking parts 23 are formed in only respective middle portions of the sidewalls 21, 22 in the longitudinal direction of the wiring grooves 20A, 20B, it is possible to moderate the restriction for the wire harnesses W in both upper and lower portions of the wiring grooves 20A, 20B. Accordingly, if mounting the wire harness W into the wiring groove 20A (20B) through its upper portion, the wire harness W can be easily mounted into the groove 20A (20B) under no influence of the temporary locking parts 23 on both sides at the initial stage of mounting operation. Thus, the temporary locking parts 23 become effective only after the wire harness W has been mounted into the groove 20A (20B) to some extent degree. Also, when pulling the wire harness W out of the groove 20A (20B) through the lower portion, the wire harness W can be pulled out smoothly since the temporary locking parts 23 do not make resistance at the initial stage of a worker's pulling operation.

Further, since the sidewalls 21, 22 of the wiring grooves 20A, 20B have the top corners 21*a*, 22*a* cut out obliquely (in a slanted shape) or in a curve (in a curved shape), a worker can mount the wire harnesses W, W into the wiring grooves 20A, 20B easily without fearing that the wire harnesses W might hook on the corners 21*a*, 22*a* accidentally. In connection, as the cover 50 is formed with the slanted wall 74 according with the so-formed corners 21*a*, 22*a*, it is possible to bear down on the wire harnesses W, W appropriately.

It will be understood by those skilled in the art that the foregoing descriptions are nothing but one embodiment of the disclosed electrical junction box and therefore, various changes and modifications may be made to the present invention without departing from the spirit and scope of the invention. For example, although the illustrated box body 10 is provided with two wiring grooves 20A, 20B, the box body 10 may be provided with a single wiring groove. Alternatively, the same body 10 may be provided with three or more wiring grooves.

What is claimed is:

1. An electrical junction box comprising, a box body configured to accommodate an electrical component; and a cover mounted on an exterior surface of a lateral side of the box body after a wire harness is wired to the box body, wherein the box body has a frontal-open type wiring groove formed on the exterior surface of the lateral side of the box body to accommodate the wire harness drawn out of the lateral side of the box body and further led from an upper part of the lateral side downwardly, the wiring groove having a U-shaped cross section, the wiring groove is defined by left and right sidewalls projecting from the exterior surface of the lateral side of the box body, the left and right sidewalls of the wiring groove have, at respective leading ends thereof, temporary locking parts projecting inside with each other for restricting slipping of the wire harness out of the wiring groove, and the cover has restricting walls configured to restrict outward deflection of the left and right sidewalls of the wiring groove by being respectively positioned outside the left and right sidewalls of the wiring groove on condition that the cover is mounted to the box body.

2. The electrical junction box as claimed in claim 1, wherein the temporary locking parts are formed by tip inclined parts resulting from inclining leading edges of the left and right sidewalls of the wiring groove inwardly, and the restricting walls of the cover include withstanding parts configured to prevent the tip inclined parts from being deflected outside by contacting with respective outsides of the tip inclined parts.

3. The electrical junction box as claimed in claim 1, wherein the cover is configured to be mounted onto the exterior surface of the lateral side of the box body by a sliding movement from an upside of the box body, and the box body and the cover respectively have slide guides configured to guide the sliding movement of the cover.

4. The electrical junction box as claimed in claim 1, wherein the wiring groove on the exterior surface of the box body comprises a plurality of wiring grooves juxtaposed to each other, the restricting walls of the cover include left and right sidewalls of the cover restricting an outward deflection of leftmost and rightmost sidewalls of the left and right sidewalls of all of the wiring grooves, and the restricting wall except the left and right sidewalls of the cover is formed by a rib formed on an interior surface of the cover so as to be inserted between two opposing sidewalls of the adjoining wiring grooves.

5. The electrical junction box as claimed in claim 1, wherein the temporary locking parts are formed in only respective middle portions of the left and right sidewalls of the wiring groove in a longitudinal direction of the left and right sidewalls of the wiring groove.

6. The electrical junction box as claimed in claim 1, wherein the left and right sidewalls of the wiring groove have top corners cut in a slanted shape or in a curved shape, and the cover has a slanted or curved part according with the slanted shape or the curved shape.

* * * * *